US008625305B2

(12) United States Patent
Hisada

(10) Patent No.: US 8,625,305 B2
(45) Date of Patent: Jan. 7, 2014

(54) PORTABLE ELECTRIC DEVICE

(75) Inventor: Kouichi Hisada, Yokohama (JP)

(73) Assignee: Kyocera Corporation, Kyoto (JP)

( * ) Notice: Subject to any disclaimer, the term of this patent is extended or adjusted under 35 U.S.C. 154(b) by 551 days.

(21) Appl. No.: 12/610,162

(22) Filed: Oct. 30, 2009

(65) Prior Publication Data

US 2010/0110653 A1 May 6, 2010

(30) Foreign Application Priority Data

Oct. 31, 2008 (JP) ................................ 2008-281608
Oct. 31, 2008 (JP) ................................ 2008-281618
Sep. 28, 2009 (JP) ................................ 2009-222375

(51) Int. Cl.
*H05K 1/14* (2006.01)
*H05K 7/16* (2006.01)

(52) U.S. Cl.
USPC .......................................... 361/810; 361/748

(58) Field of Classification Search
USPC ......................................................... 361/810
See application file for complete search history.

(56) References Cited

U.S. PATENT DOCUMENTS

| 6,011,699 | A | * | 1/2000 | Murray et al. ................. 361/814 |
| 6,141,540 | A | * | 10/2000 | Richards et al. ............ 455/575.3 |
| D488,154 | S | * | 4/2004 | Lovelady et al. ............. D14/345 |
| D495,674 | S | * | 9/2004 | Yoo et al. ................. D14/138 AB |
| 6,957,083 | B2 | * | 10/2005 | Ikeda et al. ................. 455/556.1 |
| D519,098 | S | * | 4/2006 | Han et al. ................ D14/138 AB |
| 7,664,539 | B2 | * | 2/2010 | Noma et al. ................ 455/575.1 |
| 8,326,380 | B2 | * | 12/2012 | Kaneoya ..................... 455/575.3 |
| 2003/0001817 | A1 | * | 1/2003 | Jeon ................................ 345/156 |
| 2003/0174240 | A1 | * | 9/2003 | Wada et al. .................... 348/374 |
| 2006/0176660 | A1 | * | 8/2006 | Amiri ........................... 361/683 |
| 2008/0291647 | A1 | * | 11/2008 | Hirota et al. .................. 361/752 |
| 2009/0079664 | A1 | * | 3/2009 | Nagai et al. .................... 345/1.3 |
| 2009/0122477 | A1 | * | 5/2009 | Zaitsu ....................... 361/679.26 |
| 2009/0219676 | A1 | * | 9/2009 | Murakata ................. 361/679.01 |
| 2010/0254110 | A1 | * | 10/2010 | Hasegawa et al. ............ 361/810 |
| 2012/0162957 | A1 | * | 6/2012 | Hamada et al. ............... 361/810 |

FOREIGN PATENT DOCUMENTS

| JP | 8-186626 | 7/1996 |
| JP | 2000-124637 | 4/2000 |
| JP | 2002-015827 | 1/2002 |
| JP | 2006203520 A * | 8/2006 |
| JP | 2006-238204 | 9/2006 |
| JP | 2007-053727 | 3/2007 |
| JP | 2007-124299 | 5/2007 |
| WO | WO 2007046380 A1 * | 4/2007 |

\* cited by examiner

*Primary Examiner* — Timothy Thompson
*Assistant Examiner* — Nathan Milakovich
(74) *Attorney, Agent, or Firm* — Duane Morris LLP

(57) ABSTRACT

A portable electric device such as a mobile phone is disclosed. The portable electric device comprises a first chassis and a second chassis, and the first chassis and the second chassis are foldably coupled. The first chassis comprises a case member that comprises a coupling recess, a first recess and a second recess. The coupling recess and the first recess face a same side of the case member. The second recess faces an opposite side of the case member to the coupling recess and the first recess. The second recess is located at a rear side of the coupling recess. The first recess and the second recess accommodate a first electronic component and a second electronic component, respectively.

18 Claims, 17 Drawing Sheets

PORTABLE ELECTRIC DEVICE

CROSS-REFERENCE TO RELATED APPLICATION

The present application claims priority under 35 U.S.C. §119 to Japanese Patent Application No. 2008-281608, filed on Oct. 31, 2008, entitled "PORTABLE ELECTRIC DEVICE", Japanese Patent Application No. 2008-281618, filed on Oct. 31, 2008, entitled "PORTABLE ELECTRIC DEVICE" and Japanese Patent Application No. 2009-222375, filed on Sep. 28, 2009, entitled "PORTABLE ELECTRIC DEVICE". The content of which are incorporated by reference herein in their entirety.

FIELD OF INVENTION

Embodiments of the present invention relate generally to portable electric devices, and more particularly relate to portable electric devices such as mobile phones, personal digital assistances (PDA) and game machines.

BACKGROUND OF THE INVENTION

A portable electronic device used in mobile phones, personal digital assistances and the like may comprise two chassis that are foldable and coupled to each other. The first chassis may comprise a coupling recess, and the second chassis may comprise a coupling projection that is received in and coupled to the coupling recess. In the first chassis, the coupling recess may be formed so that a side facing the second chassis is concave in a closed state.

Each chassis may comprise a case member whose depth is substantially equal to a thickness of the chassis. Each case member may comprise an accommodation recess to receive electronic components, and a side of each accommodation recess that faces its counterpart chassis can be concave. In this way, air-tightness (i.e., water-proof property) of the chassis or strength of the chassis can be improved.

However, when the first chassis comprises a case member with a depth substantially equal to the thickness of the chassis, both the coupling recess and the accommodation recess are formed while the facing sides are concave. This requires the accommodation recess and the coupling recess to be in separate regions so as not to overlap each other. As a result, space in the first chassis is not utilized effectively and therefore a size of the first chassis and thus a size of the mobile phone may be larger than they could be if space were used more efficiently.

Therefore, there is a need to establish a balance between a formation of the coupling recess and effective utilization of space in the first chassis.

SUMMARY

A portable electric device such as a mobile phone is disclosed. The portable electric device comprises a first chassis and a second chassis, and the first chassis and the second chassis are foldable and coupled to each other. The first chassis comprises a case member that comprises a coupling recess, a first recess and a second recess. The coupling recess and the first recess face a same side of the case member. The second recess faces an opposite side of the case member to the coupling recess and the first recess. The second recess is located at a rear side of the coupling recess. The first recess and the second recess accommodate a first electronic component and a second electronic component, respectively.

A first embodiment comprises a portable electronic device. The device comprises a first chassis, and a second chassis. The first chassis comprises a case member comprising a coupling recess. The first chassis also comprises a first recess comprising a first electronic component, and a second recess comprising a second electronic component. The second chassis comprises a coupling projection disposed in the coupling recess and coupled to the first chassis at the coupling projection while being foldable between an opened state and a closed state. The first electronic component and the second electronic component are accommodated in the case member. The coupling recess and the first recess face the second chassis in the closed state. The second recess is located so that at least one part thereof overlaps with the coupling recess in the facing direction in the closed state. The second recess face a direction opposite to which the first recess faces.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the invention without limiting the breadth, scope, scale, or applicability of the invention. The drawings are not necessarily made to scale.

DETAILED DESCRIPTION OF EXEMPLARY EMBODIMENTS

The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of practical non-limiting applications, namely, downsizing in a portable electric device such as a mobile phone. Embodiments of the invention, however, are not limited to such mobile phones, and the techniques described herein may also be utilized in other portable electric devices. For example, embodiments may be applicable to a computer, a Personal Digital Assistant (PDA), or a GPS system.

As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present invention.

The following description is presented to enable a person of ordinary skill in the art to make and use the embodiments of the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the embodiments of the present invention. Thus, the embodiments of the present invention are not intended to be limited to the examples described herein and shown, but are to be accorded the scope consistent with the claims.

Figure 1:
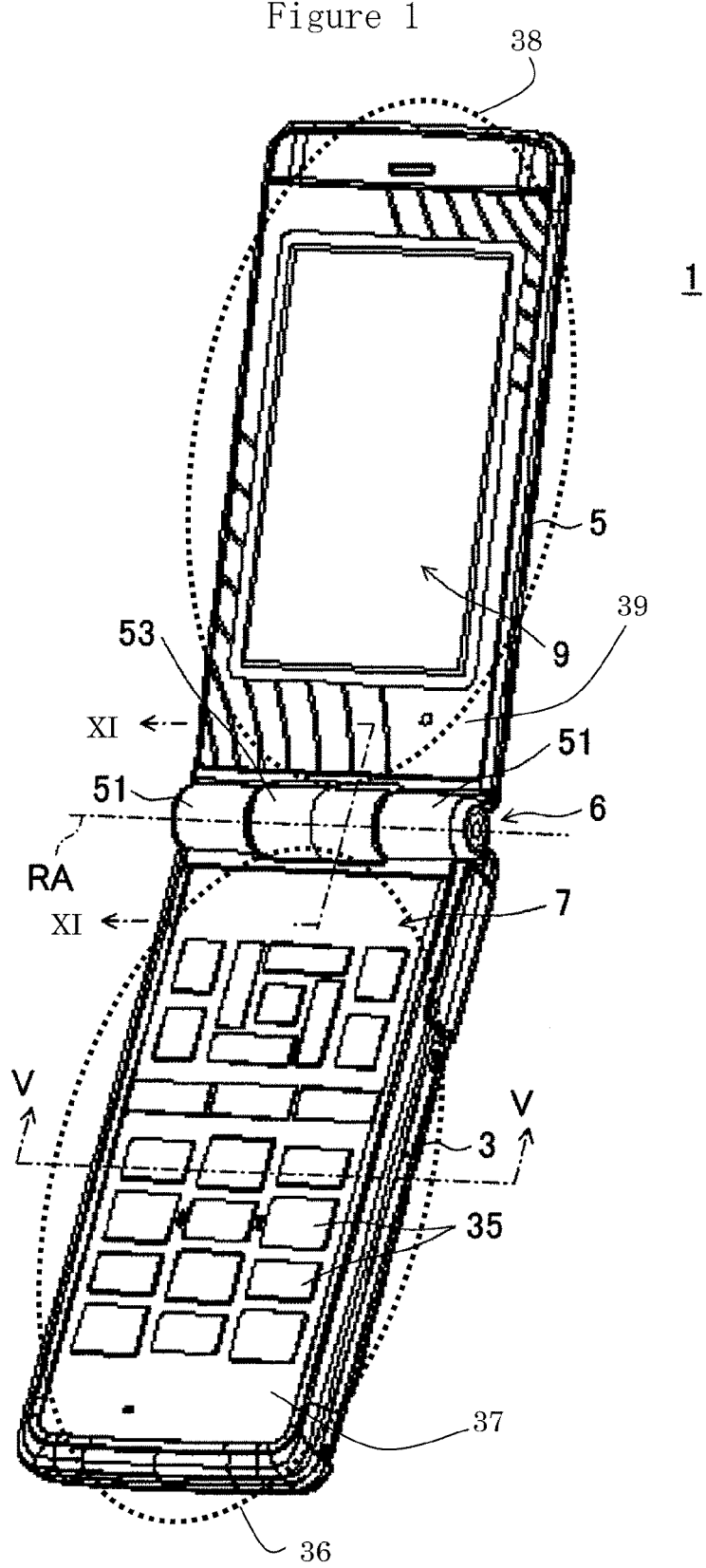
FIGS. 1 and 2 are illustrations of a perspective view of a mobile phone according embodiments of the disclosure, showing the mobile phone in an open state and closed state, respectively.
Figure 2:
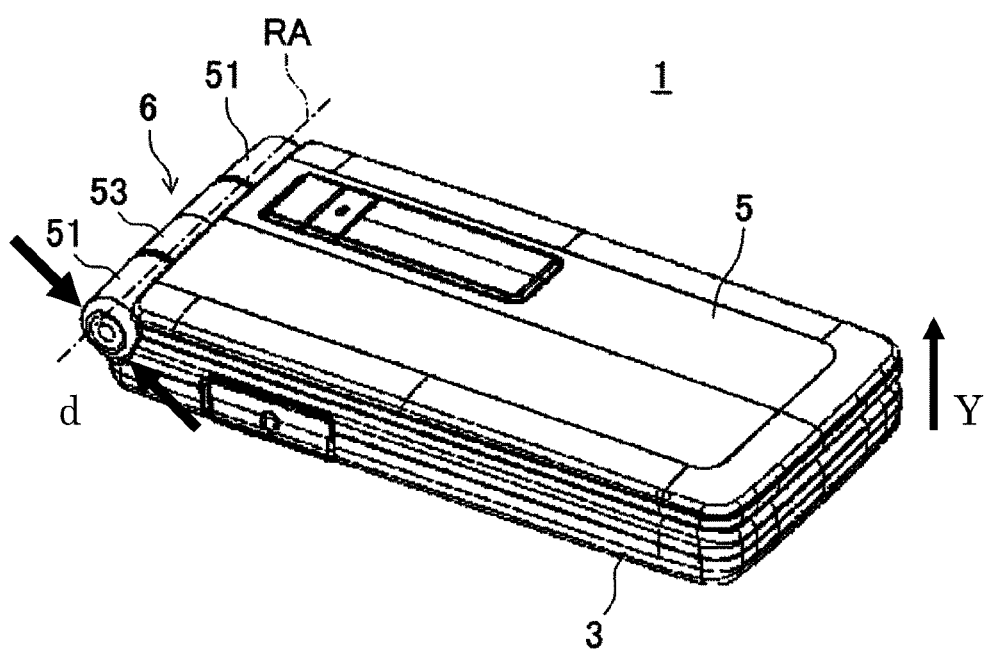

FIGS. 1 and 2 are illustration of a mobile phone 1 according to an embodiment of the present invention. FIG. 1 is an illustration of a perspective view of the mobile phone 1 in an opened state. FIG. 2 is an illustration of a perspective view of the mobile phone 1 in a closed state.

The mobile phone 1 is a so-called foldable mobile phone. The mobile phone 1 comprises a first chassis 3 and a second chassis 5. The first chassis 3 and the second chassis 5 are coupled to each other and are rotatable about a rotating axis RA relative to each other. States of the mobile phone 1 can change between an opened state and a closed state. The first chassis 3 and second chassis 5 are coupled to each other by a coupling portion 6 at one of their respective ends. In the closed state, surface 36 of the first chassis 3 and surface 38 of the second chassis 5 overlap with each other, that is, face each other. In the opened state, surfaces 37 and 39 are separated, and the first chassis 3 and the second chassis 5 are substantially parallel to each other. Each of the first chassis 3 and second chassis 5 has a low-profile shape, such as but without limitation, substantially rectangular solid shape. Outlines of shape of the first chassis 3 and the second chassis 5 substantially match with each other in the closed state. Various components of the first chassis 3 and the second chassis 5 are explained in more detail in the context of discussion of FIG. 12.

Hereinafter, a side on which the surface 36 of the first chassis 3 and the surface 38 of the second chassis 5 face each other is referred to as a front side and an opposite side is referred to as a rear side.

The coupling portion 6 may, for example but without limitation, have a cylindrical shape having a rotating axis RA. The coupling portion 6 comprises first external portions 51 and a second external portion 53. The first external portions 51 and the second external portion 53 are configured to rotate relative to each other about the rotating axis RA. The first external portions 51 comprise a portion of the first chassis 3, and the second external portion 53 comprises a portion of the second chassis 5. The two first external portions 51 are arranged in a direction of the rotating axis RA, and the second external portion 53 is located between the first external portions 51. Diameters of the first external portions 51 are substantially equal to a diameter of the second external portion 53. The first external portions 51 and the second external portion 53 are coaxially positioned to have one unified cylindrical shape as a whole.

As shown FIG. 2, the diameter d of each of the first external portions 51 and the second external portion 53 is smaller than sum of thicknesses of the first chassis 3 and second chassis 5 but larger than the thickness of the second chassis 5. As used herein thickness of the first chassis 3 and the second chassis 5 mean a length of the first chassis 3 and second chassis 5 along the direction in which the chassis face each other (i.e., the direction Y shown in FIG. 2).

The first external portions 51 and the second external portion 53 are positioned such that a surface positioned on the rear side of the second chassis 5 is substantially matched with the rear side of the second chassis 5. The first chassis 3 comprises a coupling recess 3a (see FIG. 8) to accommodate the second external portion 53 such that a surface positioned on the rear side (not shown) of the second external portion 53 is substantially matched with the rear surface of the second chassis 5. In other words, the second external portion 53 constitutes a coupling projection located in the coupling recess 3a. In this manner, the first chassis 3 and the second chassis 5 are coupled to each other and are foldable between the opened state and the closed state by a rotation relative to each other about the rotating axis RA piercing through the coupling projection.

A hinge unit (not shown) may be located in the first external portions 51 and second external portion 53, which allows the first chassis 3 and the second chassis 5 to be rotated relative to each other about the rotating axis RA. The hinge unit may include a first component that is fixed to the first chassis 3 and a second component that is fixed to the second chassis 5 while being rotatable about the rotating axis RA with respect to the first component. Alternatively, the hinge unit may be a shaft member that is inserted in the first chassis 3 and second chassis 5 in the direction of the rotating axis RA, and the hinge unit is rotatable with respect to at least one of the first chassis 3 and second chassis 5. A signal line may also be inserted in the first external portions 51 and second external portion 53 to connect electronic circuits of the first chassis 3 and second chassis 5.

Figure 3:
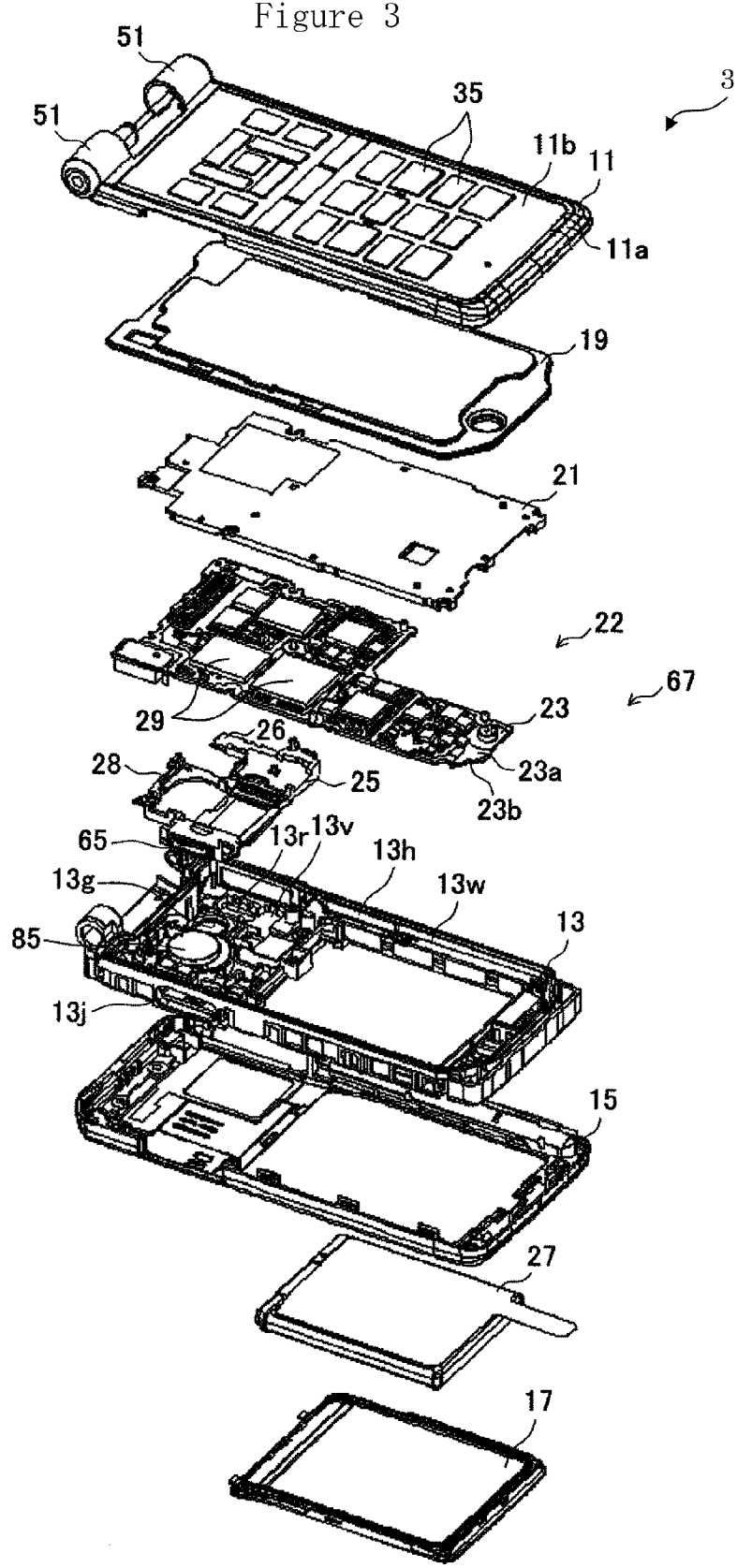
FIG. 3 is an illustration of an exploded perspective view of a first chassis shown in FIG. 1 viewed from a front side.
Figure 4:
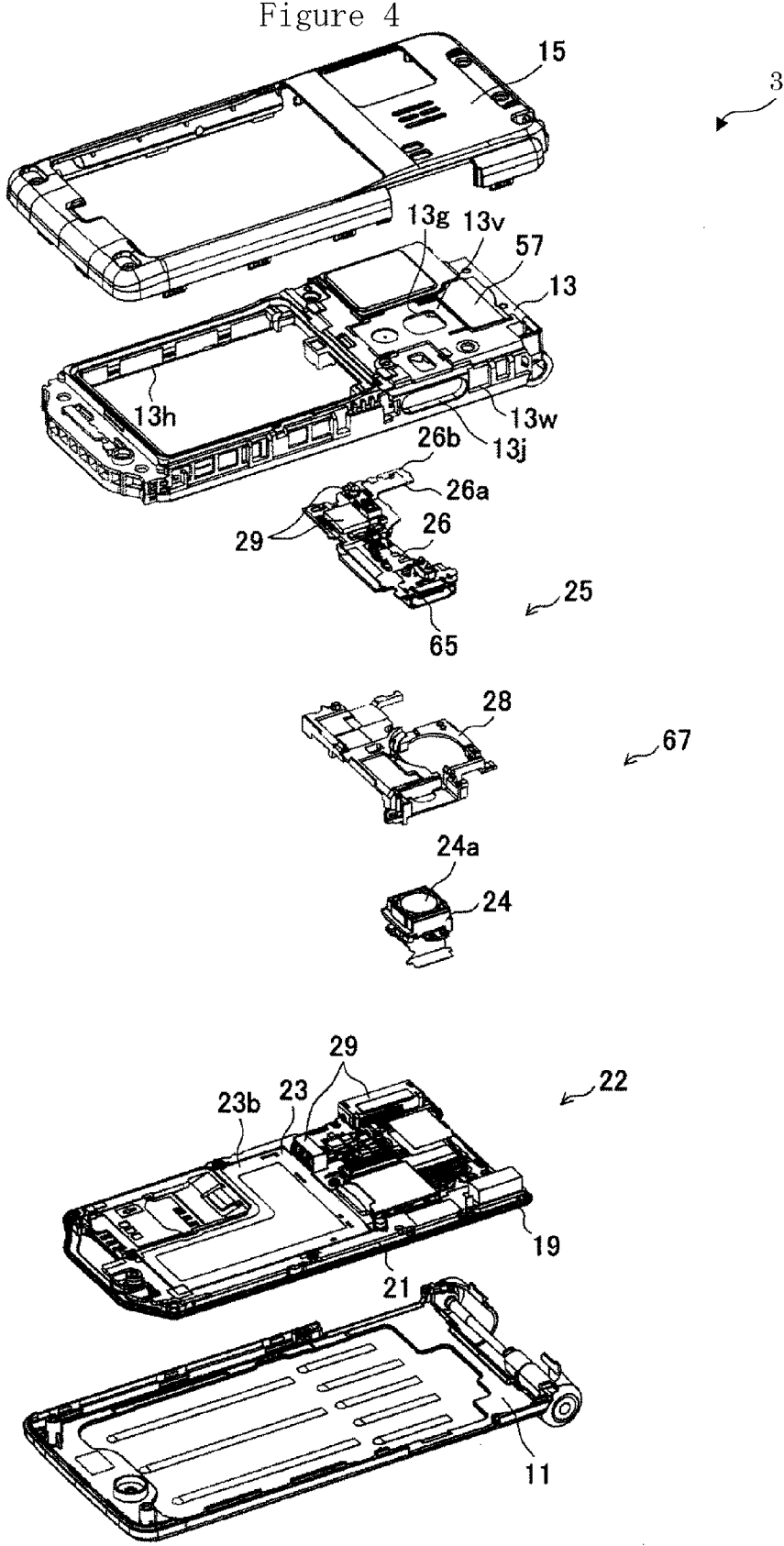
FIG. 4 is an illustration of an exploded perspective view of a first chassis shown in FIG. 1 viewed from a rear side.

FIG. 3 is an illustration of an exploded perspective view of a first chassis 3 shown in FIG. 1 viewed from a front side. FIG. 4 is an illustration of an exploded perspective view of a first chassis 3 shown in FIG. 1 viewed from a rear side. However, FIG. 3 differs from FIG. 4 in disassembled components.

The first chassis 3 comprises a front case 11 comprising a front-side portion of the first chassis 3, an inner case 13 comprising an inner-side portion of the first chassis 3, a rear case 15, and a cover 17. The rear case 15 and the cover 17 comprise the rear-side portion of the first chassis 3.

The mobile phone 1 comprises a main board assembly 22, a camera unit 24 (see FIG. 4), a sub-board assembly 25, and a battery 27 (see FIG. 3), which are disposed in a laminated manner in the order from the side substantially near the front case 11 in the first chassis 3.

As shown FIG. 3, the inner case 13 has a substantially box shape in which a side of the front case 11 is opened. The inner case 13 comprises a base portion 13v and a wall portion 13w. The base portion 13v faces the rear side of a main board 23. The wall portion 13w is vertically located on the side substantially near the front case 11 in a periphery of the base portion 13v. The wall portion 13w and the base portion 13v comprise a first recess 13r. That is, the inner case 13 comprises the first recess 13r that face the front side. An opening is in the base portion 13v to insert and take out a battery 27.

The front case 11 has a substantial box shape in which the side substantially near the inner case 13 is opened, and the front case 11 is thinner than the inner case 13. The front case 11 is placed on the inner case 13 from the front side to cover the front side of the inner case 13 therewith. The front case 11 surrounds the front-side portion of the wall portion 13w.

The rear case 15 has a substantially box shape in which the side substantially near the inner case 13 is opened, and the rear case 15 is thinner than the inner case 13. An opening is in the rear side of the rear case 15 to insert and take out the battery 27. A shape of the opening in the rear case 15 is substantially structurally isomorphic to the opening in the inner case 13, and the size of the opening in the rear case 15 is larger than the opening in the inner case 13. The rear case 15 is placed on the inner case 13 from the rear side to cover the rear side of the inner case 13 therewith. The rear case 15 surrounds the rear-side portion of the wall portion 13w.

The cover 17 has a substantially plate shape whose shape and dimensions are substantially similar to those of the opening in the rear side of the rear case 15. The cover 17 is located in the opening in the rear side of the rear case 15 to close the opening of the base portion 13v of the inner case 13.

Thus, the inner case 13 is surrounded by the front case 11, the rear case 15, and the cover 17. That is, the front case 11, the rear case 15, and the cover 17 comprise an exterior chassis 10 (see FIG. 5) that envelopes the inner case 13. Since, the exterior chassis 10 (see FIG. 5) envelopes the inner case 13, the inner case 13 servers as an internal chassis.

The front case 11, the inner case 13, the rear case 15, and the cover 17 may, for example and without limitation, be mainly made of a non-conductive resin and the like. The inner case 13 is integrally molded. The inner case 13 has a depth which is substantially equal to the thickness of the first chassis 3 and all of electric devices are stored in the first chassis 3. The front case 11, the inner case 13, and the rear case 15 are mutually fixed to one another by, for example but without limitation, a screw, an engagement portion, or the both, and the like. The cover 17 is detachably fixed to the inner case 13, the rear case 15, or the both by an engagement portion.

As illustrated in FIG. 3, the keys 35 that receive the user input are exposed in the front case 11. For example, the keys 35 may be in the front case 11. The front case 11 comprises a case body 11a and a key constructing portion 11b. The case body 11a has a frame shape and comprises an opening in which the keys 35 are exposed. The key constructing portion 11b has a plate shape and is bonded to the case body 11a so as to close the opening of the case body 11a. The key constructing portion 11b may be made of a material having a relatively low rigidity, and/or a thickness of the key constructing portion 11b is reduced, which allows the key constructing portion 11b to be easily bent in response to a force/pressure from the user. The keys 35 have indexes (i.e., concavity and convexity or pattern) indicating a pressing position in the key constructing portion 11b.

The main board assembly 22, the camera unit 24, and the sub board assembly 25 are sandwiched between the front case 11 and the inner case 13 in the direction in which these members are laminated. Specifically, these members are supported between the front case 11 and the base portion 13v of the inner case 13 mainly on both sides in a longitudinal direction of the first chassis 3. The battery 27 is fitted in the inner case 13, and the cover 17 supports the battery 27 so that the battery 27 doesn't drop out from the inner case 13.

Figure 5:
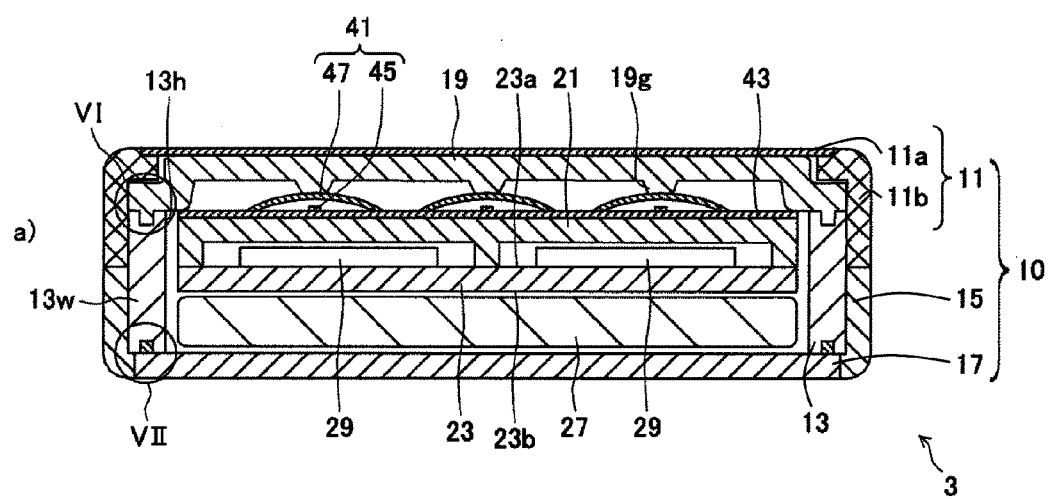
FIG. 5 is an illustration of a schematic sectional view taken along a line V-V in FIG. 1.

As illustrated in FIGS. 3 and 5, the main board assembly 22 comprises a main board 23, a shielding case 21, a flexible printed circuit (FPC) board 43, and a key sheet 19, which are laminated in the order from the side closed to the rear case 15.

The main board 23 may be, for example but without limitation, a rigid circuit board in which a hard resin is used as a base. As shown in FIGS. 3 to 5, the main board 23 comprises a first mounting surface 23a that is located on the side substantially near the front case 11 and a second mounting surface 23b that is located on the rear side of the first mounting surface 23a. Electronic components 29 are located on the first mounting surface 23a and the second mounting surface 23b.

The shielding case 21 may be made of, for example but without limitation, metal. Alternatively, the shielding case 21 may comprise a non-conductive base such as resin and a conductive layer such as a metallic layer on a surface of the non-conductive base. The shielding case 21 is coupled to a ground layer of the main board 23.

As illustrated in FIGS. 3 and 4, the sub board assembly 25 comprises a sub-board 26 and a frame 28, which are laminated in the order from the side substantially near the rear case 15.

The sub-board 26 may, for example but without limitation, be a rigid circuit board in which the hard resin is used as the base. As shown in FIG. 4, the sub-board 26 comprises a third mounting surface 26a that is located on the side substantially near the front case 11 and a fourth mounting surface 26b that is located on the rear side of the third mounting surface 26a. The electronic components 29 are located on the third mounting surface 26a and the fourth mounting surface 26b.

An external connector 65 of the electronic component 29 is mounted on the third mounting surface 26a of the sub board 26. The external connector 65 is used to connect the mobile phone 1 and another electronic device. The wall portion 13w of the inner case 13 comprises a hole 13j to expose the external connector 65 to the outside. An end portion of the external connector 65 and an end portion of the sub-board 26 are disposed in the hole 13j.

The frame 28 may, for example but without limitation, be made of resin. The frame 28 couples the sub-board 26 and camera unit 24 to the main board assembly 22. For example, the frame 28 may comprises an engagement portion (not shown) and support the sub-board 26 using the engagement portion. While the camera unit 24 is sandwiched between the frame 28 and the main board 23, the frame 28 is attached by engaging with the main board 23.

As shown in FIG. 4, the camera unit 24 comprises a lens 24a and is disposed while the lens 24a faces the base portion 13v of the inner case 13. The base portion 13v of the inner case 13 comprises a hole 13g to expose the lens 24a. The camera unit 24 receives the light from an object through the hole 13g to take an image.

Figure 6:
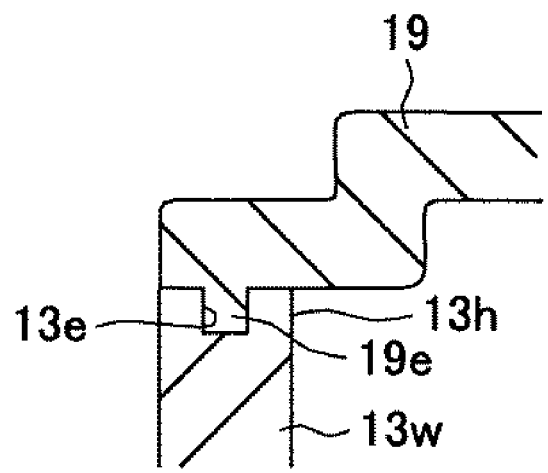
FIG. 6 is an illustration of an enlarged view of a portion shown in FIG. 5.
Figure 7:
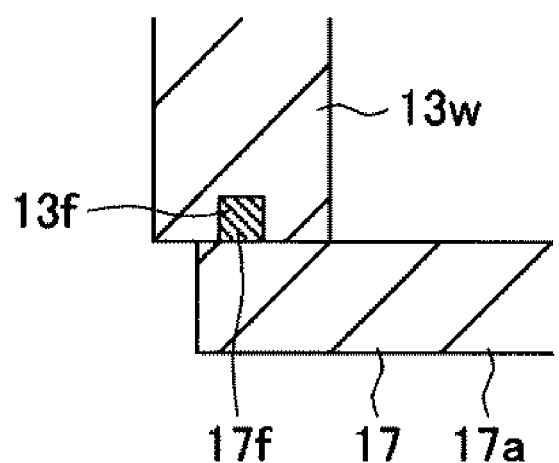
FIG. 7 is an illustration of a portion of an enlarged view of FIG. 5.

FIG. 5 is an illustration of a schematic sectional view of the first chassis taken along a line V-V in FIG. 1. FIG. 6 is an illustration of a portion of an enlarged view of a region VI of FIG. 5. FIG. 7 is an illustration of a portion of an enlarged view of a region VII of FIG. 5.

As illustrated in FIG. 5, FPC 43 comprises switches 41. For example, each of the switches 41 may be a pressing type switch. The pressing type switch may comprise a fixed contact 45 and a domal movable contact 47 with which the fixed contact 45 is covered.

The key sheet 19 may be, for example but without limitation, be made of a non-conductive elastic member, such as rubber, which has a water-proof property (i.e., water shut-off property), and the like. The key sheet 19 covers the switches 41 and comprises plungers 19g. The plungers 19g are projected toward the switches 41 and located corresponding to the switches 41. A pressing force of the user is concentrated on the center of the movable contact 47 by each of the plunger 19g.

As illustrated in FIG. 6, a grove portion 13e is on a top portion substantially near the front case 11 of the wall portion 13w so as to surround an opening 13h substantially near the front case 11. On the other hand, the key sheet 19 comprises a packing portion 19e that is extended along the periphery thereof. The key sheet 19 is attached to the inner case 13 by press-fitting the packing portion 19e in the groove portion 13e. Therefore, the first recess 13r (see FIG. 3) of the inner case 13 is sealed by the key sheet 19.

As illustrated in FIG. 7, a groove portion 13f is on the side substantially near the cover 17 of the inner case 13 so as to surround the opening in the base portion 13v. On the other hand, the cover 17 comprises a cover body 17a and a packing portion 17f. The packing portion 17f is extended along the periphery of the cover body 17a while bonded to the cover body 17a. The packing portion 17f is press-fitted in the groove portion 13f, whereby the inner case 13 is sealed while the cover 17 is attached to the inner case 13.

The FPC 43, the shielding case 21, the main board 23, the sub board assembly 25, and the battery 27 are positioned in a sealed space formed by the inner case 13, the key sheet 19, and the cover 17. In other words, the main board 23 and the like are accommodated in the first recess 13r sealed by the key sheet 19 and the cover 17.

Figure 8:
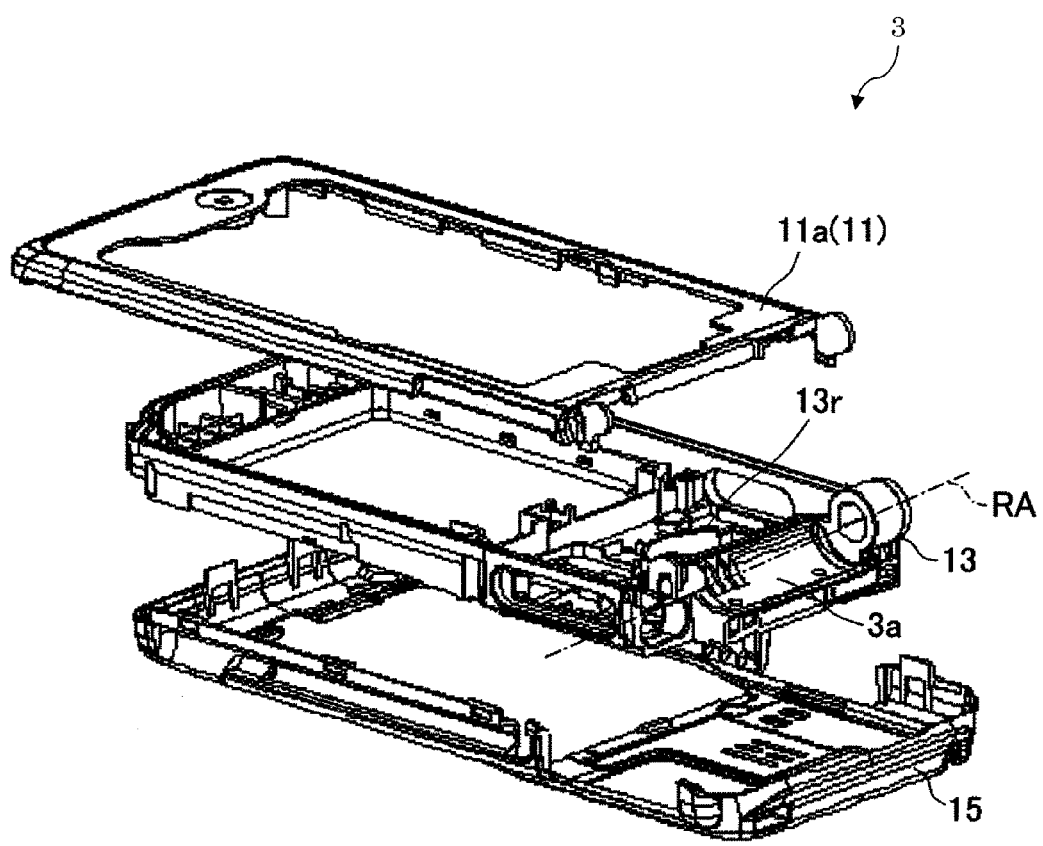
FIG. 8 is an illustration of an exploded perspective view of a first chassis shown in FIG. 3 when viewed from a side substantially near a coupling portion.
Figure 9:
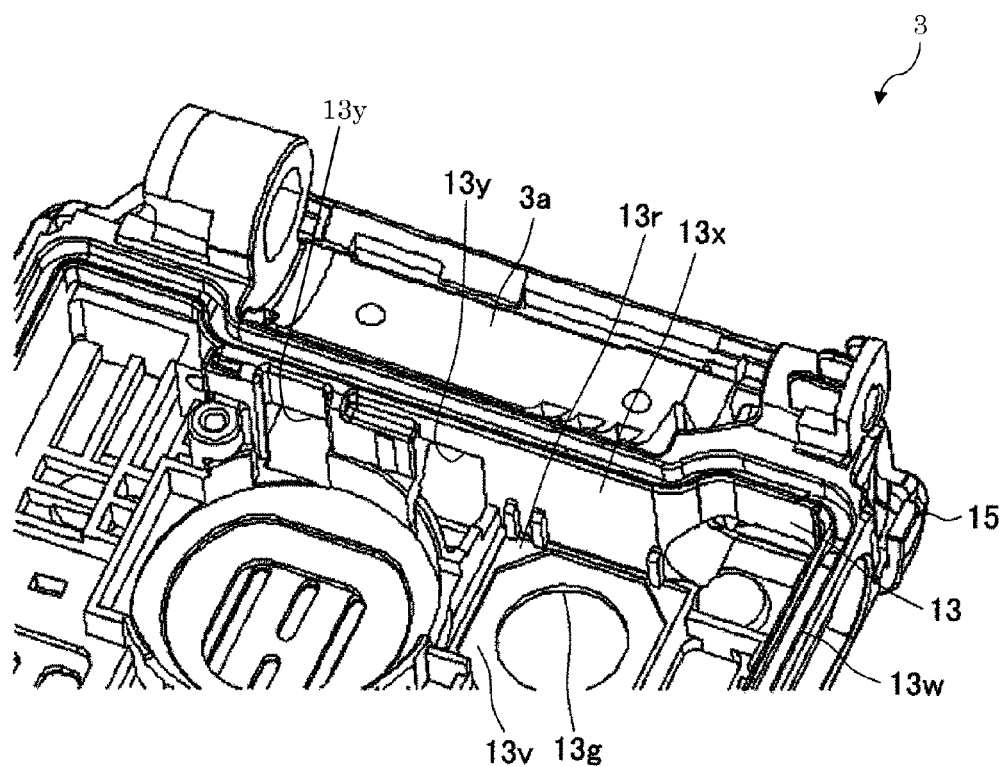
FIG. 9 is an illustration of enlarged perspective view of an inner case and a rear case in the first chassis shown in FIG. 8.

FIG. 8 is an illustration of an exploded perspective view of a first chassis 3 when viewed from a side substantially near a coupling portion 6. FIG. 9 is an illustration of enlarged perspective view of an inner case and a rear case in the first chassis shown in FIG. 8. FIG. 9 shows the neighborhood of the coupling portion 6 of the inner case 13 and rear case 15 when the neighborhood of the coupling portion 6 is viewed from the inside of the chassis. The cover 17 and the key constructing portion 11b of the front case 11 are not shown in FIG. 8. The first external portion 51 of the first chassis 3 is coupled to the case body 11a of the front case 11 (see FIG. 3), and the first external portion 51 is not shown in FIG. 8.

The coupling recess 3a in which the second external portion 53 is located is in the inner case 13, and the coupling recess 3a is exposed from an opening 10h (see FIG. 11) in the exterior chassis 10. As shown in FIGS. 8 and 9, the coupling recess 3a is formed by the peripheral surface of the inner case 13 while the front side (i.e., the side facing the second chassis 5 in the closed state) of the coupling recess 3a is concaved. That is, the coupling recess 3a faces the front side. Specifically, the coupling recess 3a is a notch in a corner portion, which is located on the side substantially near the rotating axis RA of the inner case 13 and on the front side. For example, an inner surface (i.e., concave surface) of the coupling recess 3a may be arranged in substantially coaxial with the peripheral surface of the second external portion 53 so as to face the peripheral surface of the second external portion 53 with a substantially constant micro gap.

The coupling recess 3a is adjacent to the first recess 13r on the side substantially near rotating axis RA of the first recess 13r. As illustrated in FIG. 9, a partition wall 13x is between the first recess 13r and the coupling recess 3a. The first recess 13r is not expanded to the region at the rear (i.e., the region substantially near the rear case 15) of the coupling recess 3a. That is, the first recess 13r is located inward from the coupling recess 3a. In other words, the coupling recess 3a and the first recess 13r do not overlap with each other in the direction in which the first chassis 3 and the second chassis 5 face each other in the closed state.

A method of assembling the first chassis 3 is described below.

In the first chassis 3, first the main board assembly 22, the camera unit 24, and the sub board assembly 25 are coupled to one another to form an assembly. Specifically, the engagement portion of the frame 28 engages with an edge portion of the main board 23 while the camera unit 24 is sandwiched between the main board 23 of the main board assembly 22 and the frame 28 of the sub board assembly 25. Hereinafter, the assembly except for the key sheet 19 is referred to as an internal assembly 67 (see FIGS. 3 and 4).

The internal assembly 67 is then put in the first recess 13r from the opening 13h of the inner case 13, thereby accommodating the internal assembly 67 in the first recess 13r. Portions of the main board 23 and the shielding case 21 are surrounded by the inner surface of the wall portion 13w of the inner case 13. On the other hand, the external connector 65 and the region in the sub-board 26 where the external connector 65 is mounted are projected from the main board 23 in a plane view of the main board 23 (i.e., when viewed in the direction orthogonal to a principal surface of the main board 23). Accordingly, the internal assembly 67 has a size that is larger than the opening 13h of the inner case 13 and is not accommodated in the opening 13h of the inner case 13 in the plane view of the main board 23. That is, the internal assembly 67 is not located in the inner case 13 from the opening 13h while the main board 23 is parallel with the base portion 13v of the inner case 13.

Therefore, the internal assembly 67 is located in the inner case 13 from the opening 13h while the main board 23 (see FIG. 3) is inclined with respect to the base portion 13v. Specifically, first the side of the external connector 65 of the internal assembly 67 is located in the opening 13h, and the external connector 65 is inserted in the hole 13j. Then, the side opposite to the external connector 65 of the internal assembly 67 is located in the inner case 13 from the opening 13h. That is, the main board 23 is transferred from a state inclined with respect to the base portion 13v to the parallel state.

At this point, the main board 23 and the shielding case 21 coupled to the main board 23 abut on the wall portion 13w of the inner case 13. Therefore, the main board 23 is positioned with respect to the inner case 13 in the direction along the principal surface of the main board 23.

After the internal assembly 67 is received in the inner case 13, the key sheet 19 is attached to the inner case 13. Then, the front case 11, the inner case 13, and the rear case 15 are coupled to.

The electronic component is located at the rear of the coupling recess 3a in the following manner.

Figure 10:
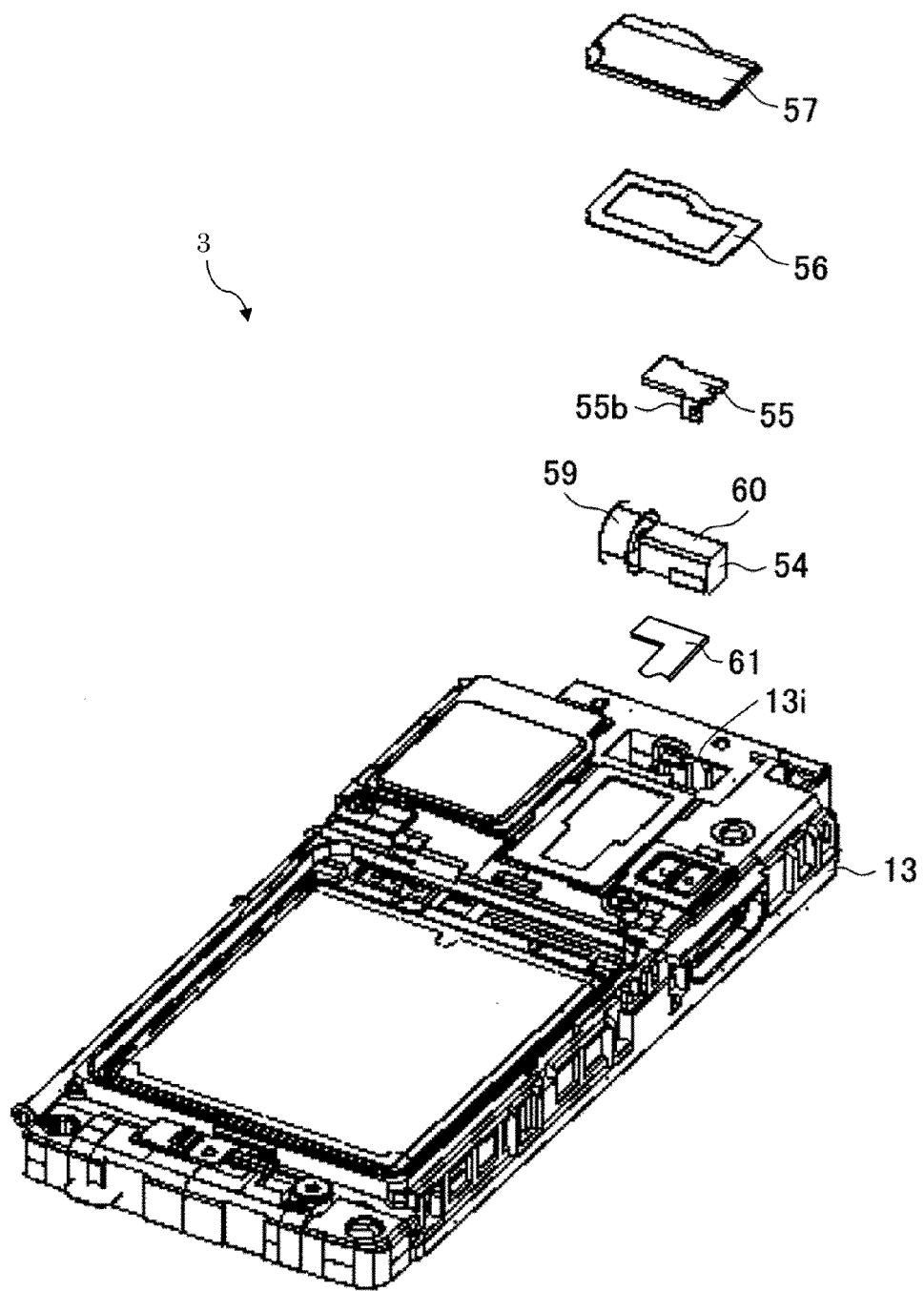
FIG. 10 is an illustration of an exploded perspective view of the first chassis shown in FIG. 3, shown from a rear side.
Figure 11:
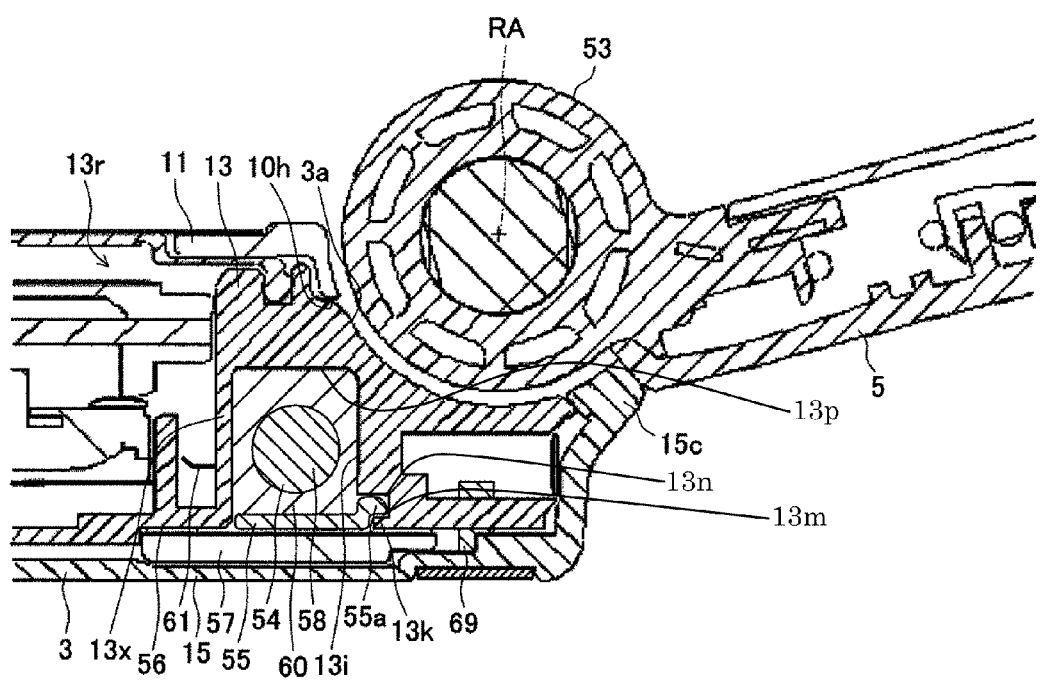
FIG. 11 is an illustration of a portion of a schematic sectional view taken along a line XI-XI in FIG. 1.

FIG. 10 is an illustration of an exploded perspective view illustrating the side located the coupling portion 6 of the inner case 13 and the rear side of the inner case 13. FIG. 11 is an illustration of a portion of a schematic sectional view taken along a line XI-XI in FIG. 1.

A second recess 13i is located on the rear side of the inner case 13. A vibrator 54 is accommodated in the second recess 13i. The second recess 13i is blocked by an internal cover 55 while blocked by a double-sided tape 56 and an external cover 57 (see FIG. 4).

Specifically, the second recess 13i is located so as to overlap with a coupling recess 3a in a plane view of the first chassis 3 (i.e., when viewed in a facing direction facing the second chassis 5 in the closed state), that is, the second recess 13i is located at a rear side of the coupling recess 3a. More specifically, as illustrated in FIG. 11, a part on the side substantially near the coupling portion 6 of the second recess 13i overlaps with a part on the side substantially near the first recess 13r of the coupling recess 3a. An end portion substantially near the first recess 13r of the second recess 13i doesn't overlap with the coupling recess 3a. That is, the end portion substantially near the first recess 13r of the second recess 13i is between the coupling recess 3a and the first recess 13r in the direction orthogonal to the facing direction in the closed state.

The second recess 13i faces the rear side, that is, the side opposite the facing direction of the first recess 13r. The second recess 13i may have, for example and without limitation, a substantially rectangular solid shape. A volume of the second recess 13i is smaller than a volume of the first recess 13r. A bottom of the second recess 13i is closer to the second chassis 5 than a bottom of the coupling recess 3a in the closed stated. As shown in FIG. 11, the bottom of the second recess 13i is above the bottom of the coupling recess 3a.

The vibrator 54 comprises a motor 58 (see FIG. 11), a weight 59 (see FIG. 10) that is rotated by the motor 58, and a holder 60 that holds the motor 58.

The motor 58 is a rotary motor. The motor 58 comprises a magnetic field system (not shown) that constitutes one of a rotor and a stator, an armature that constitutes a rotor or stator that is complementary to the field system, a case that holds the stator, and an output shaft that is projected from the case while coupled to the rotor.

The weight 59 is made of, for example but without limitation, a metal which has relatively high density and the like, and is coupled to the output shaft of the motor 58 such that a barycenter of the weight 59 is biased with respect to a shaft core of the output shaft of the motor 58. Because the weight 59 is biased with respect to the output shaft of the motor 58, a vibration is generated when the motor 58 is driven to rotate the weight 59.

The holder 60 is made of an elastic member, for example but without limitation, rubber, and the like. The holder 60 comprises a space in which the case of the motor 58 is fitted. The peripheral surface of the holder 60 has a shape in which the holder 60 can be press-fitted in the second recess 13i. That is, according to an embodiment, the peripheral surface of the holder 60 has a substantially rectangular-solid shape whose width is slightly larger than a width (i.e., length in the direction which is orthogonal to the rotating axis RA and is orthogonal to a surface of the first chassis 3 facing the second chassis 5) of the second recess 13i. While the output shaft of the vibrator 54 is parallel with the rotating axis RA, the holder 60 is elastically deformed to press-fit the vibrator 54 in the second recess 13i.

The internal cover 55 made of, for example but without limitation, resin and the like and has a substantially rectangular plate shape. The internal cover 55 may have dimensions that completely block the second recess 13i, or the internal cover 55 may have dimensions that partially block the second recess 13i. FIG. 10 illustrates the case in which the internal cover 55 has dimensions that expose the weight 59 of the vibrator 54.

The internal cover 55 engages with the inner case 13. For example, the internal cover 55 comprises a first engagement portion 55a (see FIG. 11) that is on the side substantially near the rotating axis RA and a second engagement portion 55b (see FIG. 10) that is on the side far from the rotating axis RA. The first engagement portion 55a is projected outward in the direction along the body portion of the internal cover 55. The second engagement portion 55b is projected in the direction orthogonal to the body portion of the internal cover 55. The second engagement portion 55b comprises a hole.

The second recess 13i comprises a first engaged portion 13k and an engagement recess and a second engaged portion (not illustrated). The first engaged portion 13k engages with the first engagement portion 55a (see FIG. 11). The first engaged portion 13k is a projection that is projected toward the inside of the second recess 13i in the direction orthogonal to the recess direction of the second recess 13i. The engagement recess is located in the back (i.e., bottom side of the second recess 13i) of the second recess 13i adjacent to the first engaged portion 13k, and the first engagement portion 55a is inserted in the engagement recess. The second engaged portion engages with the second engagement portion 55b. As with the first engaged portion 13k, the second engaged portion is a projection that is projected toward the direction orthogonal to the recess direction of the second recess 13i.

The second engaged portion (not shown) is inserted in the hole of the second engagement portion 55b, and the first engagement portion 55a is inserted in the engagement recess adjacent to the first engaged portion 13k, thereby attaching the internal cover 55 to the inner case 13. The internal cover 55 presses the vibrator 54 (i.e., holder 60) in the direction in which the vibrator 54 is press-fitted in the second recess 13i. The holder 60 is compressed by the internal cover 55 and the bottom of the second recess 13i. A reactive force from the vibrator 54 and/or a force applied to the inner surface of the internal cover 55 by the vibration of the vibrator 54 are supported by the first engaged portion 13k and/or the second engaged portion (not shown).

The external cover 57 may be made of, for example but without limitation, resin and the like and has a substantially rectangular plate shape. The external cover 57 has dimensions in which the opening of the second recess 13i is covered therewith. The double-sided tape 56 is an elastic member, such as, for example but without limitation, rubber, an applied bonding agent on both surfaces thereof, and the like. The double-sided tape 56 has a frame shape that surrounds the opening of the second recess 13i.

A peripheral portion of the external cover 57 is bonded to the surrounding of the opening of the second recess 13i by the double-sided tape 56. Accordingly, the second recess 13i is sealed by the external cover 57. The external cover 57 may abut or may not abut on the internal cover 55. However, when the external cover 57 abuts on the internal cover 55, the external cover 57 and the internal cover 55 may be located so that a large force is not applied from the vibrator 54 to the external cover 57 through the internal cover 55. That is, the external cover 57 and the internal cover 55 may be located so that the external cover 57 does not abut on the internal cover 55 with a large contact pressure.

As illustrated in FIG. 9, the first recess 13r and the second recess 13i are coupled to each other by a communication hole 13y made in the partition wall 13x. As illustrated in FIGS. 10 and 11, a connecting FPC 61 (in which the connecting FPC 61 is shown partially) is inserted in the communication hole 13y. The connecting FPC 61 is connected to the motor 58, and the connecting FPC 61 is also coupled to the main board 23, the sub board 26, or FPC 43, which is received in the first recess 13r. Therefore, the motor 58 is driven by an electric power supplied from the main board 23, the sub-board 26, or FPC 43. In this embodiment, as shown in FIG. 9, the first chassis 3 comprises two communication holes 13y. That is, a wall is placed between the two communication holes 13y. In this case, the connecting FPC 61 is inserted in one of the communication hole 13y. In the other hand, a part of the weight 59 which is relatively-big is located in the other communication hole 13y. Therefore, the vibrator 54 can not only be located at the position which it works efficiently but also be inserted easily into the first chassis 3, thereby improving both of the efficient use of the space in the first chassis 3 and the ease of insertion.

As illustrated in FIG. 11, on the end portion of the first chassis 3 outside the second recess 13i, a screw 69 is inserted in the rear case 15 and threaded into the inner case 13. Therefore, the rear case 15 and the inner case 13 are coupled.

In the rear case 15, a portion comprising an edge portion of the opening 10h that exposes the coupling recess 3a act as a stopper 15c. The stopper 15c abuts on the second chassis 5 in the opened state and controls the further movement in the opened direction. An edge portion substantially near the stopper 15c of the coupling recess 3a supports the stopper 15c in the direction in which the second chassis 5 and the stopper 15c abut on each other (i.e., the direction along the concave surface), thereby substantially reinforcing strength of the stopper 15c.

Figure 12:
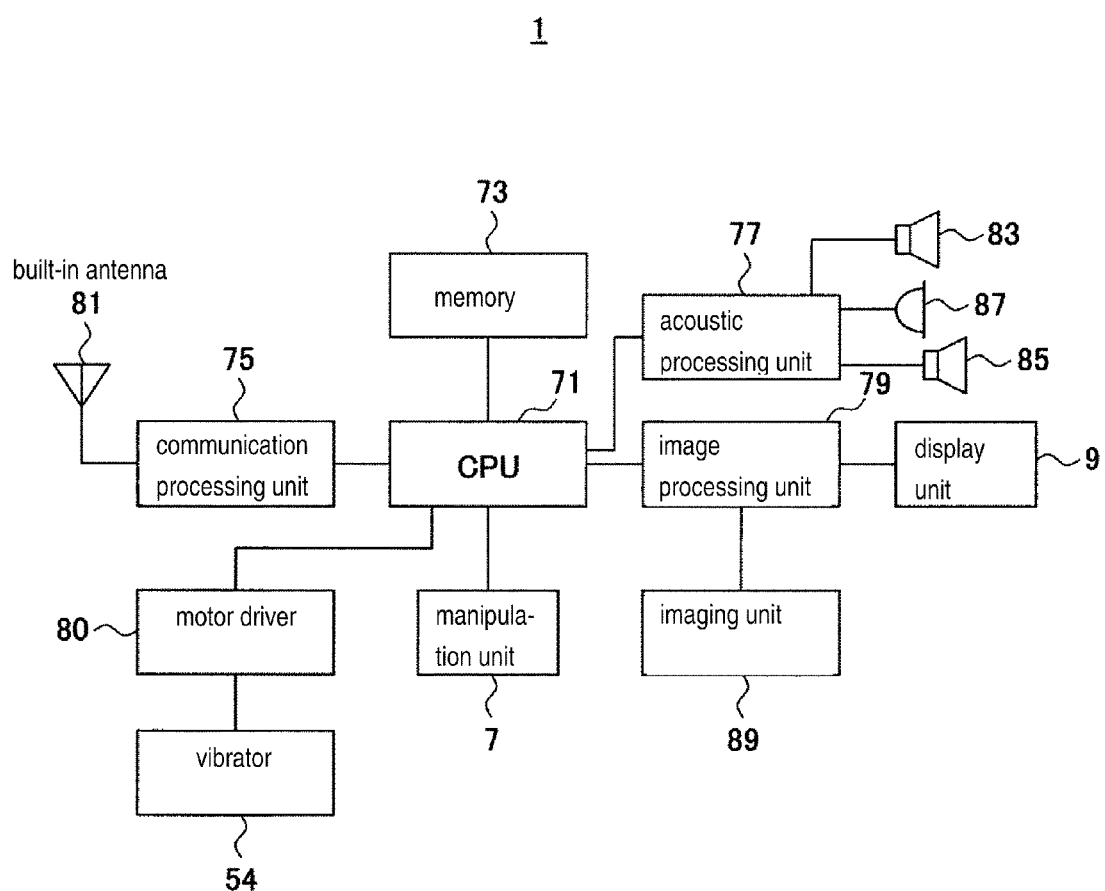
FIG. 12 is an illustration of schematic block diagram of a signal processing system of the mobile phone shown in FIG. 1.

FIG. 12 is a block diagram illustrating an example of a configuration of a signal processing system of the mobile phone 1. The signal processing system comprises a central processing unit (CPU) 71, a memory 73, a communication processing unit 75, an acoustic processing unit 77, an image processing unit 79, and a motor driver 80. These units comprise the electronic components 29 provided in the main board 23, FPC 41, and sub-board 26.

The CPU 71 and the memory 73 act as a control unit. The control unit performs a predetermined operation based on signals supplied from various units such as the manipulation unit 7 including the keys 35, and the control unit controls various units such as the image processing unit 79.

The communication processing unit 75 conducts communication wirelessly with another mobile terminal device or a server through a communication system (i.e., a telephone network or the Internet). Specifically, the communication processing unit 75 modulates various pieces of data, such as acoustic data and image data, which are processed by CPU 71, and the communication processing unit 75 transmits the modulated signal through the built-in antenna 81. The communication processing unit 75 demodulates the signal that is received through the built-in antenna 81, and the communication processing unit 75 supplies the demodulated data to the CPU 71.

The acoustic processing unit 77 converts the acoustic data from the CPU 71 into an electric signal, and the acoustic processing unit 77 supplies the electric signal to the communication speaker 83 or the speaker 85 that outputs an annunciation sound. The speakers 83 and 85 convert the electric signal from the acoustic processing unit 77 into a sound, and the speakers 83 and 85 supply the sound. On the other hand, the microphone 87 converts the fed sound into the electric signal, and the microphone 87 supplies the electric signal to the acoustic processing unit 77. The acoustic processing unit 77 converts the electric signal from the microphone 87 into the acoustic data, and the acoustic processing unit 77 supplies the acoustic data to the CPU 71.

The image processing unit 79 converts the image data from the CPU 71 into an image signal, and the image processing unit 79 supplies the image signal to the display unit 9. The image processing unit 79 converts the image signal (i.e., image data) supplied from the imaging unit 89 into an image data having a predetermined format, and the image processing unit 79 supplies the image data to CPU 71. The imaging unit 89 comprises the camera unit 24.

The motor driver 80 supplies a driving power to the motor 58 based on the control signal from the CPU 71. For example, the CPU 71 supplies a control signal to the motor driver 80 in response to a telephone call or reception of an electronic mail from another communication terminal.

Advantages of the embodiment of the disclosure comprise the following:

As described above, the mobile phone 1 comprises the first chassis 3 comprising the coupling recess 3a and the second chassis 5 comprising the second external portion 53 that is positioned in the coupling recess 3a. The second chassis 5 is coupled to the first chassis 3 at the second external portion 53 while being foldable between the opened state and the closed state. The mobile phone 1 also comprises the vibrator 54 that is accommodated in the first chassis 3 and the electronic components such as the main board 23. The first chassis 3 comprises the inner case 13. The inner case 13 comprises the first recess 13r accommodating the main board 23 and the like and the second recess 13i accommodating the vibrator 54. The coupling recess 3a has the side facing the second chassis 5 that is concaved in the closed state. The first recess 13r is at the position where the first recess 13r does not overlap with the coupling recess 3a in the direction facing the second chassis 5 in the closed state, and the first recess 13r faces the second chassis 5 in the closed state. The second recess 13i is at the position where the second recess 13i overlaps with the coupling recess 3a in the direction facing the second chassis 5 in the closed state, and the second recess 13i faces the side opposite the facing direction of the first recess 13r.

Accordingly, the space at the rear of the coupling recess 3a can effectively be utilized. Therefore, the first chassis 3 can be downsized with having the water-proof property, that is, the balance between the formation of the coupling recess and the effective utilization of space can be established in the first chassis 3 comprising the inner case 13.

Specifically, in the mobile phone 1, the space can be utilized effectively without expanding substantially onto the region at the rear of the coupling recess 3a. Therefore, the space can be utilized effectively without using an assemble method wherein the electronic components are inserted at an angle toward the side substantially near the rotating axis RA to place the main board 23 and the like in the inner case 13. That is, the assemble method of first inserting the electronic component with inkling toward the side substantially near the external connector 65 is adopted to locate the main board 23 and the like in the inner case 13, and the vibrator 54 can be located in the inner case 13 through another process. Accordingly, the space is effectively utilized while the ease of the work for accommodating the electronic components is maintained. Additionally, because the second recess 13i is located in the inner case 13 so as not to be an undercut portion in injection molding, the inner case 13 comprising the coupling recess 3a, the first recess 13r and second recess 13i is easy to form. Thus, the inner case 13 is easily molded, and the work for accommodating the electronic components is easily performed in the inner case 13.

Additionally, because the coupling recess 3a, the first recess 13r, and the second recess 13i are located in the inner case 13, the depth of the inner case 13 can be substantially equal to the thickness of the first chassis 3. Therefore the strength and air-tightness of the first chassis 3 can be improved.

Accordingly, the balance between the excellent waterproof property and the compactness can be established in the mobile phone 1.

The mobile phone 1 also comprises the key sheet 19 sealing the first recess 13r and the external cover 57 sealing the second recess 13i. Therefore, the inner case 13 is sealed to make the chassis have the high sealing property.

The communication hole 13y is in the inner case 13 to communicated the first recess 13r and the second recess 13i. The main board 23 and the like and the vibrator 54 are connected by the connecting the FPC 61 inserted in the communication hole 13y. Accordingly, the electronic circuit can be formed in the inner case 13 while the effective utilization of space is achieved in the inner case 13 by the two recesses facing different directions.

The first chassis 3 comprises the exterior chassis 10 that surrounds the inner case 13, and the exterior chassis 10 comprises the opening 10h to expose the coupling recess 3a. Accordingly, the design of the first chassis 3 is improved by the exterior chassis 10, and the inner case 13 is exposed from the exterior chassis 10 in the portion covered by the second external portion 53, which allows the coupling portion 6 to be downsized.

The electronic component positioned in the first recess 13r is the circuit board (i.e., main board 23), and the electronic component received in the second recess 13i is the vibrator 54. Accordingly, the vibrator 54 can be located in the end portion of the first chassis 3 to which the vibration is easily transmitted while the relatively large electronic component is accommodated in the relatively wide first recess 13r, whereby the electronic component is properly disposed.

Other advantages of the embodiment of the disclosure comprise the following:

As described above, the mobile phone 1 comprises the inner case 13 comprising the second recess 13i and the vibrator 54 press-fitted in the second recess 13i. The vibrator 54 is latched in the inner case 13 while pressed in the direction in which the vibrator 54 is press-fitted in the second recess 13i. The mobile phone 1 also comprises the internal cover 55 obstructing the second recess 13i and the external cover 57 covering the internal cover 55 and sealing the second recess 13i.

Because the vibrator 54 is received and sealed in the inner case 13 independently of other electronic components, the vibrator 54 can be brought into close contact with the inner case 13 to facilitate transmission of the vibration of the vibrator 54 to the outside, and an influence of the vibration on other electronic components can be reduced. Additionally, because the vibrator 54 is pressed by the internal cover 55 latched in the inner case 13, the vibration of the vibrator 54 can better be transmitted to the inner case 13, and the influence of the vibration on a sealing property of the external cover 57 can be reduced. That is, the improvement of the vibration transmission property and the improvement of the water-proof property are achieved by one member (i.e., internal cover 55).

The vibrator 54 comprises the motor 58 and the holder 60 that is of the elastic member interposed between the motor 58 and the second recess 13i, so that the vibrator 54 can securely be brought into close contact with the inner surface of the second recess 13i to transmit the vibration to the inner case 13. The internal cover 55 can reduce a loss of the sealing property of the external cover 57 caused by an elastic force of the holder 60. Further, the holder 60 can be brought into close contact with the inner surface of the second recess 13i in the surroundings of the communication hole 13y to reduce leakage of the water from the second recess 13i to the first recess 13r.

The inner case 13 comprises the first engaged portion 13k. The first engaged portion 13k is located in the second recess 13i, and the first engaged portion 13k is projected in the direction orthogonal to the concave direction of the second recess 13i. The first engaged portion 13k comprises a first surface 13m located on a side substantially near a bottom of the second recess 13i (i.e., a back side of the first engaged portion 13k) and facing the rear side. Because the internal cover 55 is supported by the first surface 13m of the first engaged portion 13k, it is not necessary to make a through-hole in the second recess 13i for inserting a member in order to fit the internal cover 55 to the second recess 13i. Therefore, the property for sealing the second recess 13i is improved, and the vibrator 54 is pressed in the press-fitting direction while the internal cover 55 is securely supported by the inner case 13.

Because the second recess 13i is on the end portion of the inner case 13, the vibration of the vibrator 54 is easily transmitted to the outside of the inner case 13.

The inner case 13 also comprises the first recess 13r, and the first recess 13r is sealed while the electronic components such as the main board 23 are accommodated therein. The second recess 13i is located outside the first recess 13r. Accordingly, as described above, the influence of the vibration of the vibrator 54 on the properties for sealing other electronic components such as the main board 23 can be reduced.

As described above, in the mobile phone 1, the second recess 13i is located at the position where the second recess 13i overlaps with the coupling recess 3a in the direction facing the second chassis 5 in the closed state. That is, a part of the second recess 13i is located at the rear of the coupling recess 3a. Accordingly, the region that overlaps with the coupling recess 3a to easily be a dead space in the inner case 13 can be utilized, and the vibrator 54 can be disposed in the end portion in which the vibration can easily be transmitted to the outside.

The mobile phone 1 is an example of the portable electronic device, the second external portion 53 is an example of the coupling projection, the main board 23 is an example of the first electronic component, and the vibrator 54 is an example of the second electronic component. The inner case 13 is an example of the case member, the key sheet 19 is an example of the first sealing member, the external cover 57 is an example of the second sealing member, the connecting the FPC 61 is an example of the signal line, and the exterior chassis 10 is an example of the exterior case.

The internal cover 55 is an example of the obstructing member, the external cover 57 is an example of the sealing member, the holder 60 is an example of the elastic member, and the first engaged portion 13k is an example of the engaged portion.

The portable electronic device is not limited to the mobile phone. For example, the portable electronic device may be a notebook computer, PDA, a game machine, and a camera. The second electronic component is not limited to the vibrator. For example, the second electronic component may be a speaker or a camera. That is, the second electronic component may be a component that is suitable to transmit the vibration of the speaker to the outside instead of the vibrator.

It is not necessary to seal the second recess. The chassis of the portable electronic device may be a two-shaft hinge type chassis including a folding operation as long as the chassis is foldable. By the second sealing member (in the first embodiment, the external cover 57) that seals the second recess in which the vibrator is accommodated, other recesses and holes may be sealed.

Figure 13:
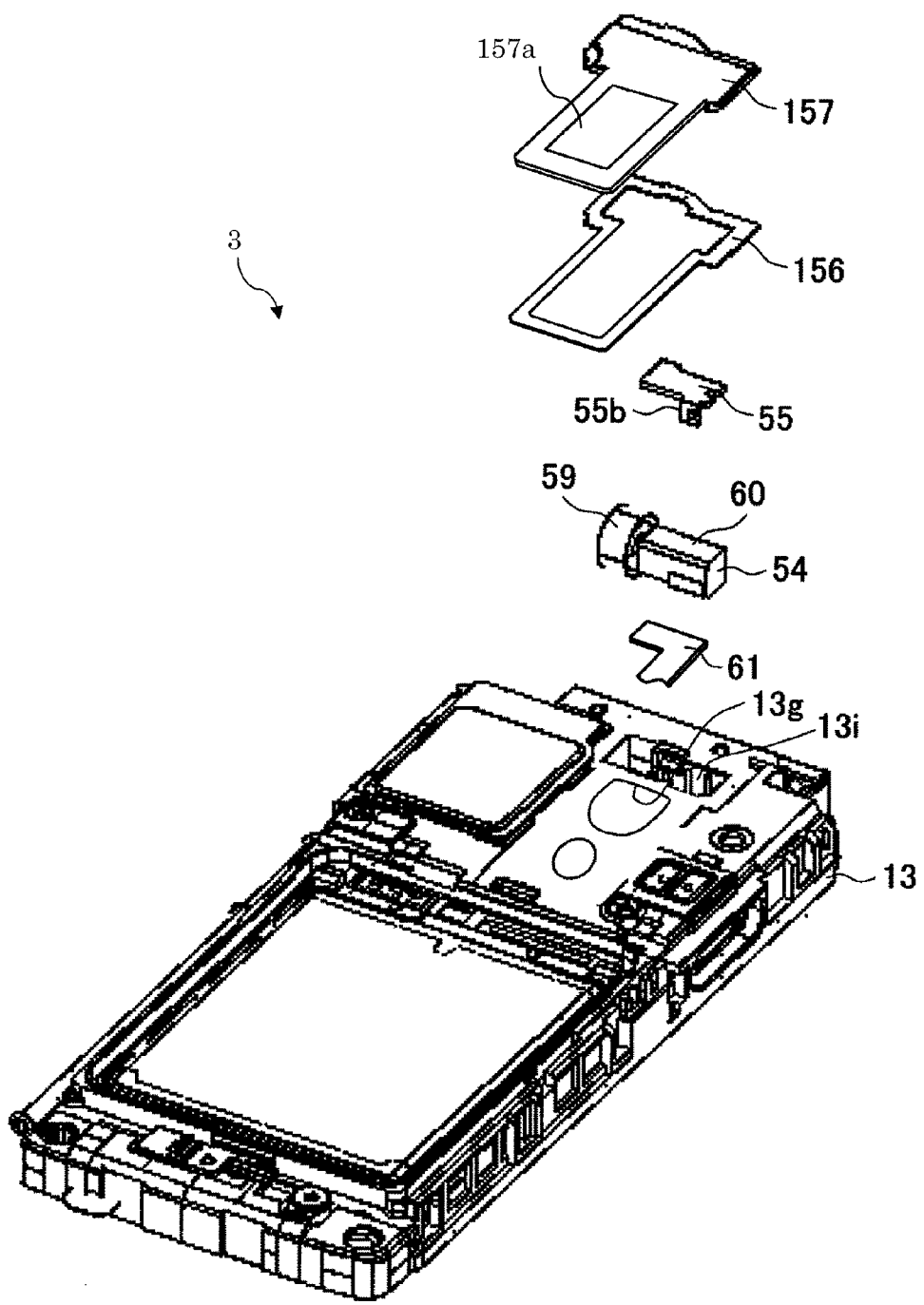
FIG. 13 is an illustration of an exploded perspective view of modification of the first chassis shown in FIG. 10.

FIG. 13 is an illustration of an exploded perspective view of modification of the first chassis shown in FIG. 10. FIG. 13 shows a modification of the second sealing member. The first chassis 3 comprises an external cover 157 comprising a transparent portion 157a and a double-sided tape 156. The external cover 157 has the dimensions with which not only the second recess 13i but the hole 13g that exposes the lens 24a of the camera unit 24 (see FIG. 4) are covered. The transparent portion 157a is located in the portion facing the hole 13g of the external cover 157. The double-sided tape 156 has the dimensions with which not only the second recess 13i but the hole 13g are surrounded. A peripheral portion of the external cover 157 is bonded to the surrounding of a region covering both of the opening of the second recess 13i and the hole 13g by the double-sided tape 156. Accordingly, the external cover 157 seals not only the second recess 13i but the hole 13g.

As described above, the influence of the vibrator 54 on the sealing property of the external cover 157 is reduced by the internal cover 55, so that the external cover 157 can also be used to seal the hole 13g. Accordingly, the number of components can be decreased.

Alternatively, according to another embodiment, instead of the vibrator 54, the built-in antenna 81 (i.e., second electronic component, antenna) is received in the second recess 13i is described below.

Figure 14:
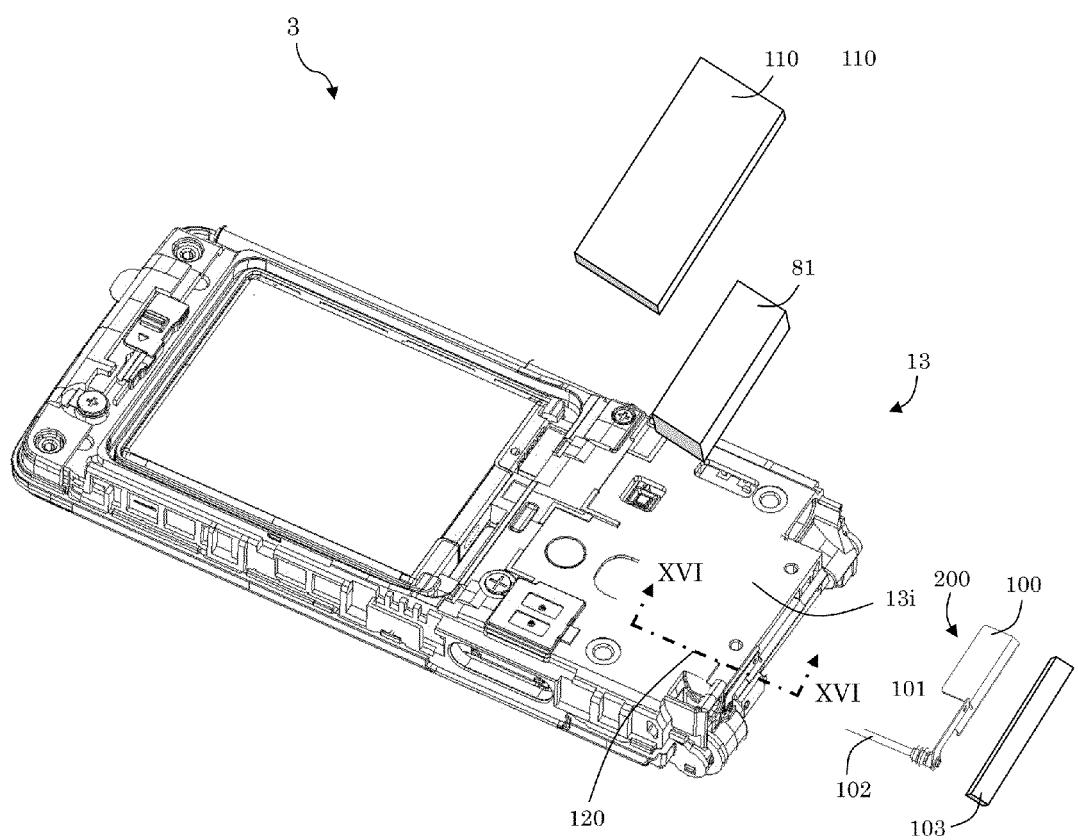
FIG. 14 is an illustration of an exploded perspective view of an inner case in a mobile phone shown from a rear side according to an embodiment of the disclosure.

FIG. 14 is an illustration of an exploded perspective view of an inner case 13 in a mobile phone shown from a rear side according to an embodiment of the invention.

Figure 15:
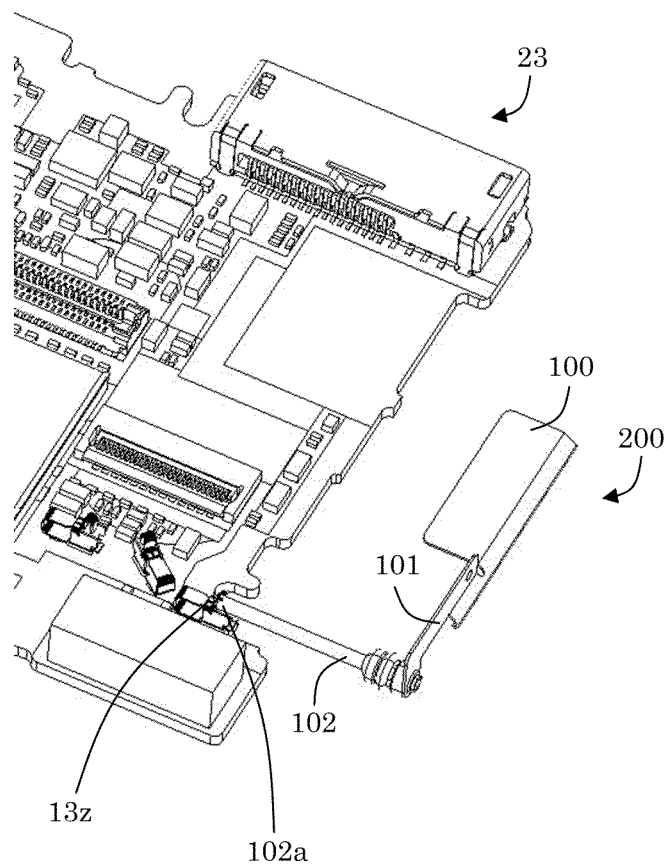
FIG. 15 is an illustration of a perspective view of a main board of a mobile phone shown from a rear side according to an embodiment of the disclosure, showing a state in which a sheet-metal member is coupled to the main board.

FIG. 15 is an illustration of a perspective view of a main board 23 of a mobile phone 1 shown from a rear side according to an embodiment of the disclosure, showing a state in which a sheet-metal member 200 is connected to the main board 23.

Figure 16A:
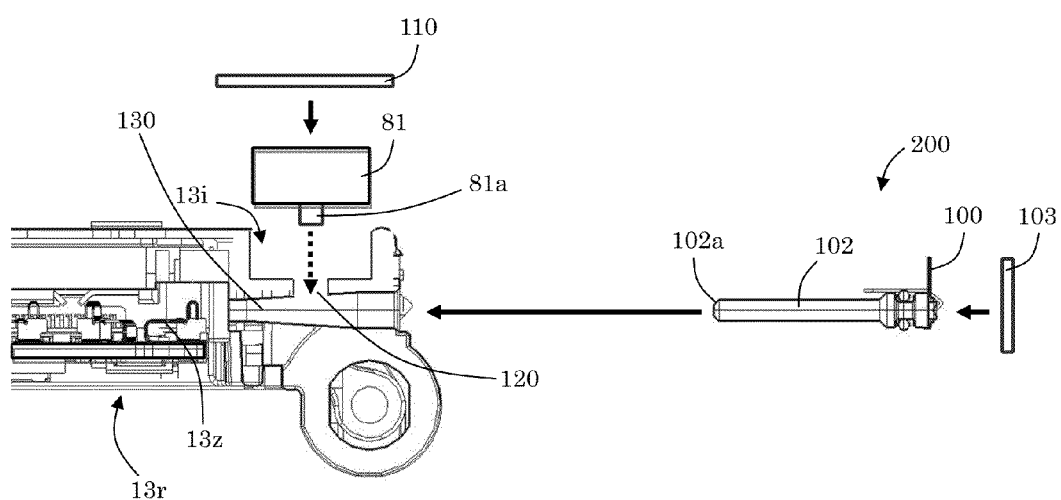
FIG. 16A is an illustration of an exploded sectional view of t taken along a line XVI-XVI in FIG. 14 showing positions of a built-in antenna and a sheet-metal member in an inner case.
Figure 16B:
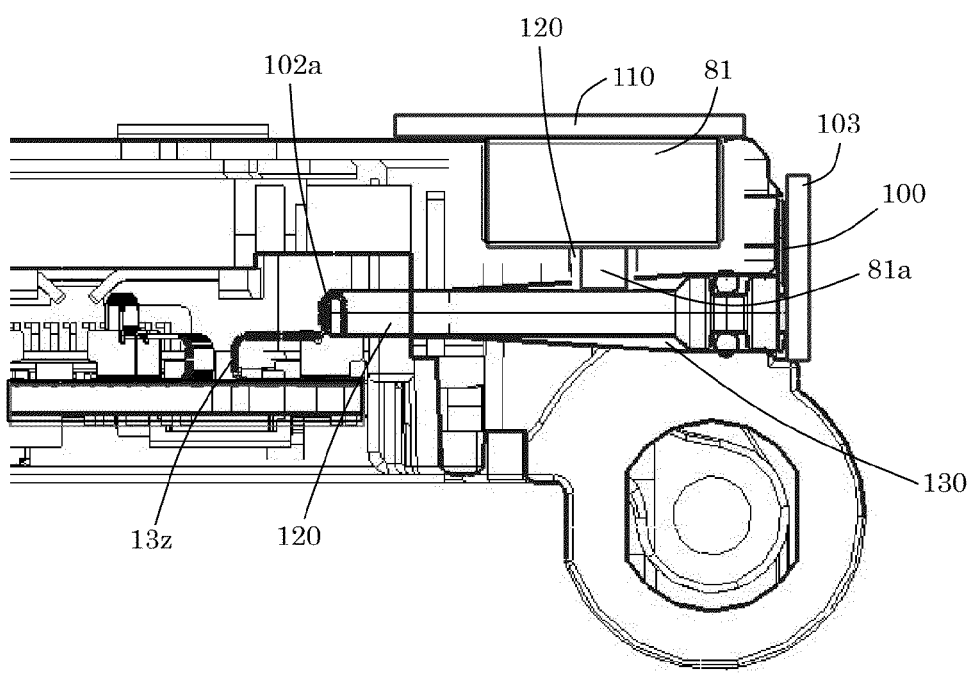
FIG. 16B is an illustration of a sectional view of taken along a line XVI-XVI in FIG. 14 showing a state in which an inner case accommodates a built-in antenna and a sheet-metal member.

FIG. 16 is an illustration of an exploded sectional view of taken along a line XVI-XVI in FIG. 14 showing positions of a built-in antenna 81 and a sheet-metal member 200 in an inner case 13.

FIG. 17 is a sectional view taken along the line XVI-XVI in FIG. 14. FIG. 17 illustrates the state in which the built-in antenna 81 and the sheet-metal member 200 are positioned in the inner case 13. Embodiments shown in FIGS. 14 to 17 may have a structure that is similar to the embodiments shown in FIGS. 1 to 13, common features, functions, and elements will not be redundantly described herein.

As illustrated in FIG. 14, the second recess 13i is on the rear side of the inner case 13. The built-in antenna 81 is received in the second recess 13i. The second recess 13i is obstructed by an external cover 110 while a fixing member such as the double-sided tape is interposed therebetween. A hole 120 is in the bottom surface of the second recess 13i. As illustrated in FIGS. 16 and 17, a conductive projection 81a is inserted in the hole 120. The built-in antenna 81 comprises a bottom surface facing the second recess 13i. The conductive projection 81a is electrically coupled to the bottom surface of the built-in antenna 81.

On the other hand, as illustrated in FIG. 16, the inner case 13 comprises an end face substantially near the coupling recess 3a. A communication hole 130 is in the end face of the inner case 13 to couple the first recess 13r and the external space outside the inner case 13. An inner diameter of the communication hole 130 is gradually decreased toward the first recess 13r from the external space outside the inner case 13. A metallic rod 102 of a sheet-metal member 200 described below is inserted in the communication hole 130. In addition to the communication hole 130, a boss (not illustrated) is in the end face of the inner case 13, and a screw is threaded in the boss. The communication hole 130 and the fixed sheet-metal member 200 are blocked by an external cover 103 while the fixing member such as the double-sided tape is interposed therebetween.

The built-in antenna 81 transmits and/or receives a communication signal. The built-in antenna 81 transmits and/or receives the communication signal, for example but without limitation, in a frequency band of 800 MHz for the telephone call or data communication, a GPS frequency band, a wireless LAN communication band, or the like.

As illustrated in FIG. 15, the sheet-metal member 200 comprises a metallic plate 100, a metallic rod 102, and a connecting plate 101 that couples the metallic plate 100 and the metallic rod 102.

The screw is threaded in the boss located in the end face of the inner case 13, whereby the metallic plate 100 is coupled to the inner case 13. The metallic plate 100 abuts on the inner surface of the stopper 15c when the inner case 13 is coupled to the rear case 15, thereby reinforcing the strength of the stopper 15c.

As illustrated in FIG. 16, the metallic rod 102 is inserted in the communication hole 130 from the external space outside the inner case 13 toward the first recess 13r, the metallic rod 102 abuts on the inner surface of the communication hole 130, and the metallic rod 102 is fixed to the inner case 13. While the metallic rod 102 is inserted in the communication hole 130, a leading-end portion 102a on the insertion direction side of the metallic rod 102 is located in the first recess 13r. The leading-end portion 102a abuts on a power feeding pin 13z that is mounted on the main board 23 accommodated in the first recess 13r, thereby putting the leading-end portion 102a to connect electrically to the power feeding pin 13z. The power feeding pin 13z is connected to a communication processing unit 75 mounted on the main board 23. On the other hand, while the metallic rod 102 is inserted in the communication hole 130, the metallic rod 102 abuts on the conductive projection 81a that is electrically connected to the built-in antenna 81.

As a result, the built-in antenna 81 is electrically connected to the communication processing unit 75 through the conductive projection 81a, the metallic rod 102, and the power feeding pin 13z, so that the communication processing unit 75 can perform signal processing to the communication signal that is transmitted and/or received by the built-in antenna 81.

According to an embodiment, the mobile phone 1 comprises the inner case 13 comprising the second recess 13i, the built-in antenna 81 and the external cover 110. The built-in antenna 81 is press-fitted in the second recess 13i. The external cover 110 seals the second recess 13i in which the built-in antenna 81 is located.

The built-in antenna 81 is located and sealed in the inner case 13 independently of other electronic component with having the waterproof property. Accordingly, the influence of other electronic components on the built-in antenna 81 can be reduced to decrease degradation of an antenna characteristic of the built-in antenna 81.

Additionally, as described above, the sheet-metal member 200 is used to reinforce the strength of the stopper 15c by abutting on the inner surface of the stopper 15c. The sheet-metal member 200 is also used to feed the electric power into the built-in antenna 81. Therefore, the sheet-metal member 200 can effectively be utilized.

Alternatively, the metallic rod 102 may act as a ground. For example, the metallic rod may electrically be connected to a ground layer on the main board 23 that is accommodated in the first recess 13r. In this manner, the sheet-metal member 200 can be used to conduct static electricity from the outside of the first chassis 3 to the ground efficiently. Accordingly, the sheet-metal member 200 can be used for not only the power feeding of the built-in antenna 81 and the reinforcement of the strength of the stopper 15c but the improvement of the electrostatic countermeasure.

A conductive member that is capacitively coupled to the sheet-metal member 200 may be disposed near the coupling portion 6 of the second chassis 5. In this manner, the communication signal that is transmitted and/or received by the built-in antenna 81 is efficiently transmitted onto the side of the second chassis 5, so that the sheet-metal member 200 can also be used to improve the antenna characteristic of the built-in antenna 81.

While at least one exemplary embodiment has been presented in the foregoing detailed description, the present is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying Figures, it is to be noted that changes and modifications may be apparent to those skilled in the art. Such changes and modifications are to be understood as being included within the scope of the present invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A portable electronic device comprising:
   a first chassis comprising an inner case member comprising:
      a coupling recess;
      a first recess containing an electronic component; and
      a second recess containing a vibrator operable to generate vibration therein, wherein the first recess and the second recess are divided by an inner wall of the inner case member; and
   a second chassis comprising a hinge portion that includes a coupling projection rotatably coupled to the coupling recess and coupled to the first chassis at the coupling projection and operable to fold between an opened state and a closed state with respect to the first chassis, wherein
      the coupling recess and the first recess face the second chassis in the closed state, and
      the second recess is located so that at least one part thereof overlaps with the coupling recess in a direction facing the second chassis in the closed state, and an opening of the second recess faces in a direction away from the hinge portion.

2. The portable electronic device according to claim 1, wherein the first recess is disposed not to overlap with the coupling recess in a direction facing the second chassis in the closed state.

3. The portable electronic device according to claim 1, wherein at least one part of the second recess is located between the coupling recess and the first recess in a direction orthogonal to a direction facing the second chassis in the closed state.

4. The portable electronic device according to claim 3, wherein an end portion adjacent to the first recess or the second recess is located between the coupling recess and the first recess in the direction orthogonal to the direction facing the second chassis in the closed state.

5. The portable electronic device according to claim 1, wherein a bottom of the second recess is closer to the second chassis than a bottom of the coupling recess in the closed state.

6. The portable electronic device according to claim 1, further comprising:
   a first sealing member operable to seal the first recess; and
   a second sealing member operable to seal the second recess.

7. The portable electronic device according to claim 1, wherein the inner case member further comprises:

a communication hole between the first recess and the second recess, and the electronic component and the vibrator are coupled by a signal line inserted in the communication hole.

8. The portable electronic device according to claim 1, wherein:
the first chassis comprises an exterior case surrounding the inner case member, and
the exterior case comprises an opening that exposes the coupling recess.

9. The portable electronic device according to claim 1, wherein the electronic component is a circuit board.

10. The portable electronic device according to claim 9, wherein the second recess is located adjacent to an end portion of the inner case member.

11. The portable electronic device according to claim 1, further comprising:
an obstructing member that obstructs the second recess and is operable to latch the inner case member in response to the vibrator pressing against the second recess; and
a second sealing member with which the obstructing member is covered to seal the second recess.

12. The portable electronic device according to claim 11, wherein the vibrator comprises:
a motor; and
an elastic member located between the motor and the second recess.

13. The mobile electronic device according to claim 11, wherein:
the inner case member comprises an engaged portion projected in the second recess in a direction orthogonal to a concave direction of the second recess,
the engaged portion comprises a first surface located on a side adjacent to a bottom of the second recess, and
the obstructing member is supported by the first surface of the engaged portion.

14. The portable electronic device according to claim 12 further comprising an imaging unit that receives light from a hole in the inner case member, wherein the second sealing member comprises a transparent portion with which the hole is covered and seals both the second recess and the hole.

15. The portable electronic device according to claim 11, wherein the second recess is located adjacent to an end portion of the inner case member.

16. The portable electronic device according to claim 11, wherein an end portion adjacent to the first recess or the second recess is located between the coupling recess and the first recess in a direction orthogonal to a direction facing the second chassis in the closed state.

17. The portable electronic device according to claim 1, wherein the first recess comprises an opening on a first surface of the inner case member and the second recess comprises an opening on a second surface of the inner case member, wherein the first and second surfaces are on opposite sides of the inner case member.

18. The portable electronic device according to claim 1 wherein the coupling recess comprises a concave surface and the second recess is located adjacent to the coupling recess and encroaches at least partially under the concave surface of the coupling recess in a direction away from the first recess.

* * * * *